United States Patent
Ruan et al.

(10) Patent No.: US 9,764,984 B2
(45) Date of Patent: Sep. 19, 2017

(54) PLASTOMER-MODIFIED ASPHALT BINDERS MEETING MSCR SPECIFICATIONS, ASPHALT PAVING MATERIALS WITH SUCH ASPHALT BINDERS, AND METHODS FOR FABRICATING SUCH ASPHALT BINDERS

(71) Applicant: Honeywell International Inc., Morristown, NJ (US)

(72) Inventors: Yonghong Ruan, Wayne, NJ (US); Scott M. Hacker, River Edge, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 212 days.

(21) Appl. No.: 14/604,028

(22) Filed: Jan. 23, 2015

(65) Prior Publication Data

US 2015/0225296 A1 Aug. 13, 2015

Related U.S. Application Data

(60) Provisional application No. 61/937,206, filed on Feb. 7, 2014.

(51) Int. Cl.

| | |
|---|---|
| *C04B 26/26* | (2006.01) |
| *C08L 95/00* | (2006.01) |
| *C09D 195/00* | (2006.01) |
| *C09J 195/00* | (2006.01) |
| *C04B 28/36* | (2006.01) |
| *C04B 111/00* | (2006.01) |
| *C04B 111/60* | (2006.01) |

(52) U.S. Cl.
CPC ............. *C04B 26/26* (2013.01); *C04B 28/36* (2013.01); *C08L 95/00* (2013.01); *C09D 195/00* (2013.01); *C09J 195/00* (2013.01); *C04B 2111/0075* (2013.01); *C04B 2111/00482* (2013.01); *C04B 2111/00586* (2013.01); *C04B 2111/00637* (2013.01); *C04B 2111/60* (2013.01)

(58) Field of Classification Search
None
See application file for complete search history.

(56) References Cited

U.S. PATENT DOCUMENTS

| 4,497,921 A * | 2/1985 | Chang .................... C08L 95/00 524/59 |
|---|---|---|
| 6,027,557 A | 2/2000 | Hayner et al. |
| 6,203,606 B1 | 3/2001 | Bond et al. |
| 6,444,731 B1 | 9/2002 | Memon |
| 6,764,542 B1 | 7/2004 | Lackey et al. |
| 7,150,785 B2 | 12/2006 | Gale et al. |
| 7,341,656 B1 | 3/2008 | Malone et al. |
| 7,550,175 B1 | 6/2009 | Blankenship et al. |
| 7,772,302 B2 | 8/2010 | Partanen et al. |
| 7,993,441 B2 | 8/2011 | Kleiger et al. |
| 7,993,442 B2 | 8/2011 | Crews et al. |
| 8,198,350 B2 | 6/2012 | Fee et al. |
| 8,206,500 B1 | 6/2012 | Mathis et al. |
| 8,895,641 B2 | 11/2014 | Vaidya et al. |
| 2004/0249025 A1 | 12/2004 | Dean |
| 2005/0101701 A1* | 5/2005 | Stuart, Jr. ............... C08L 95/00 524/59 |
| 2010/0319577 A1 | 12/2010 | Naidoo et al. |
| 2011/0005430 A1 | 1/2011 | Martin |
| 2011/0269877 A1 | 11/2011 | Buras et al. |
| 2013/0008344 A1 | 1/2013 | Ranka et al. |
| 2013/0042793 A1 | 2/2013 | Peregrine et al. |
| 2013/0123396 A1 | 5/2013 | Pochert |
| 2013/0202356 A1 | 8/2013 | Hussein et al. |
| 2013/0266374 A1 | 10/2013 | Reinke |

FOREIGN PATENT DOCUMENTS

| KR | 1281969 B1 | 7/2013 | |
|---|---|---|---|
| WO | 2011112569 A2 | 9/2011 | |
| WO | WO 2012103206 A2 * | 8/2012 | ............ C08L 95/00 |

OTHER PUBLICATIONS

The International Search Report mailed Apr. 29, 2015 in International Applicaiton No. PCT/US2015/013650.
Santagata et al., A Novel Procedure for the Evaluation of Anti-Rutting Potential of Asphalt Binders, International Journal of Pavement Engineering, vol. 16, Issue 4, 287-296, 2015.
Nazzal et al., Investigation of Foamed Warm Mix Asphalt Performance Using the MEPDG, Geotechnical Special Publication, n. 225 GSP, p. 1602-1611, 2012, GeoCongress 2012: State of the Art and Practice in Geotechnical Engineering.
Zelelew et al., Laboratory Evaluation of the Mechanical Properties of Plant-Produced Warm-Mix Asphalt Mixtures, Road Materials and Pavement Design, v 14, n 1, p. 49-70, 2013.
Apeagyei et al., Rutting Resistance of Asphalt Concrete Mixtures That Contain Recycled Asphalt Pavement, Transportation Research Record, n 2208, p. 9-16, Dec. 1, 2011.
Hussein et al., Influence of Polymer Type and Structure on Polymer Modified Asphalt Concrete Mix, Canadian of Journal Chemical Engineering, v 84, n 4, p. 480-487, Aug. 2006.
Moghadas et al., Evaluation of Rutting Properties of High Density Polyethelene Modified Binders, Materials and Structures, Aug. 2014.

(Continued)

*Primary Examiner* — Christopher M Rodd
(74) *Attorney, Agent, or Firm* — Lorenz & Kopf, LLP

(57) ABSTRACT

Plastomer-modified asphalt binders meeting MSCR specifications, asphalt paving materials with such asphalt binders, and methods for fabricating such asphalt binders are provided. The asphalt binder contains a base asphalt and a plastomer. If the plastomer has a drop point no greater than about 139° C., the asphalt binder further contains sulfur; sulfur-containing compounds, such as hydrocarbyl polysulfides and thiuram disulfides; phenolic resins; metal oxides; or a combination thereof. The asphalt binder is substantially free of elastomer.

19 Claims, 2 Drawing Sheets

(56) References Cited

OTHER PUBLICATIONS

Laukkanen et al., Creep-Recovery Behavior of Bituminous Binders and its Relation to Asphalt Mixture Rutting, Materials and Structures/Materiaux et Constructions, Nov. 9, 2014.

Moghadas et al., Effect of High Density Polyethylene on the Fatigue and Rutting Performance of Hot Mix Asphalt—A Laboratory Study, Road Materials and Pavement Design, vol. 15, Issue 3, 746-756, 2014.

* cited by examiner

| Composition | | | | | | | | | |
|---|---|---|---|---|---|---|---|---|---|
| PG64-22D | 97.5% | 97.5% | 97.5% | 96.5% | 97.5% | 96.5% | 97.0% | 97.0% | 96.75% |
| Honeywell Titan™ 7686 | 2.5% | | | | | | | | |
| Honeywell Titan™ 7387 | | 2.5% | | | | | | | |
| Honeywell Titan™ 7212 | | | 2.5% | | | | | | |
| Honeywell Titan™ 7287 | | | | 3.5% | | | | | |
| Honeywell Titan™ 7933 | | | | | 2.5% | | | | |
| Honeywell Titan™ 7457 | | | | | | 3.5% | 3.0% | | |
| Honeywell Titan™ 7817 | | | | | | | | 3.0% | 3.25% |
| Total | 1.00 | 1.00 | 1.00 | 1.00 | 1.00 | 1.00 | 1.00 | 1.00 | 1.00 |
| MSCR Specification | Temp (°C) | | | | | | | | |
| $J_{nr, 3.2kPa}$ (kPa$^{-1}$) | 64 | 1.02 | 0.72 | 0.87 | 0.84 | 1.41 | 1.07 | 1.55 | 0.99 | 0.92 |
| $J_{nr}$ diff <= 75% | 64 | 176.82% | 295.36% | 257.93% | 39.85% | 18.85% | 29.09% | 13.79% | 33.57% | 30.36% |
| Polymer Drop Point (Degree C) | | 136 | 127 | 126 | 152 | 155 | 155 | 167 | 140 | 140 |
| MSCR Grade | 64 | Failed | Failed | Failed | 64V | 64H | 64H | 64H | 64V | 64V |

FIG. 1

US 9,764,984 B2

PLASTOMER-MODIFIED ASPHALT BINDERS MEETING MSCR SPECIFICATIONS, ASPHALT PAVING MATERIALS WITH SUCH ASPHALT BINDERS, AND METHODS FOR FABRICATING SUCH ASPHALT BINDERS

TECHNICAL FIELD

The technical field generally relates to asphalt binders, asphalt paving materials, and methods for fabricating such asphalt binders, and more particularly relates to plastomer-modified asphalt binders that meet MSCR specifications, asphalt paving materials with such asphalt binders, and methods for fabricating such asphalt binders.

BACKGROUND

Asphalt is commonly used as a paving material for road construction and maintenance. Typically, asphalt, often referred to as "asphalt binder" or "asphalt cement," is mixed with aggregate to form material used in asphalt paving. Processing and use of this material by paving crews yield asphalt pavement. The asphalt pavement comprises aggregate held within a continuous phase of the asphalt binder by adherence of the asphalt binder to the aggregate.

The strength and durability of the asphalt pavement depends on various factors such as the properties of the materials used, the interaction of the various materials, the mix design, construction practices, and the environmental and traffic conditions to which the pavement is exposed. To produce a mix that will have good performance during the lifetime of the pavement, it is important to attain proper coating of the aggregate with the asphalt with the optimum asphalt binder film thickness, good adhesion of the asphalt onto the aggregate, and good cohesive strength of the asphalt.

Conventional pavements suffer from various types of distress modes such as permanent deformation. Permanent deformation is a significant problem for asphalt pavement. A road may be about 80 to about 100° C. or more warmer in the summer than it is in the winter. At warmer temperatures, asphalt pavement softens and can creep and move creating ridges and ruts, often referred to as "rutting." Rutting of the asphalt pavement can occur under the weight of heavy trucks or traffic that has temporarily stopped, such as, for example, at a traffic light intersection, since rutting is dependent on both the weight of the vehicle and the time duration of the weight application.

To reduce or prevent rutting, polymers or other materials having a relatively higher modulus than the asphalt, or that can produce a higher modulus asphalt binder at higher temperatures than the unmodified asphalt, are often incorporated into conventional asphalt binders. Typical polymers used to modify asphalt binders to reduce or prevent rutting include elastomers, such as, for example, styrene/butadiene/styrene copolymer (SBS), and plastomers, such as, for example, polyethylene, ethylene/vinyl acetate copolymer (EVA), and the like. Compared to elastomers, some plastomers have several advantages such as, for example, low viscosity and better workability at both the asphalt fabrication plant and at the paving construction site. As a result, low temperatures can be used to process asphalt and also to pave roads. This results in significant environmental and economic benefits. Another material used to produce higher modulus asphalt binders is polyphosphoric acid (PPA). In many cases, however, the use of this material is limited due to corrosivity issues, reports of premature cracking of pavements constructed with binders modified with PPA and in some cases outright bans. Plastomers are more easily handled than PPA and do not have the corrosivity issues Recently, the Multiple Stress Creep Recovery (MSCR) test has been developed to evaluate an asphalt binder's rutting resistance. Properties that can be evaluated by the MSCR test are the non-recoverable creep compliance, $J_{nr}$, and the stress sensitivity, $J_{nr,diff}$. For certain plastomers, while they may meet $J_{nr}$ standards (and traditional Performance Grade (PG) standards for that matter), their stress sensitivity parameters $J_{nr,diff}$ are higher than the allowed maximum value and, as a result, these plastomers should be used in combination with elastomers to meet specifications. However, in these cases, the workability benefits of the plastomers may disappear, that is, for example, higher temperatures may have to be used to process the asphalt and also to pave the roads. This could lead to serious environmental pollution and could dramatically increase energy costs.

Accordingly, it is desirable to provide asphalt binders with plastomers such that the asphalt binders meet MSCR criteria. In addition, it is desirable to provide asphalt binders with plastomers that result in asphalt binders that meet MSCR criteria without requiring elastomers. It is further desirable to provide asphalt paving material that includes such asphalt binders and that are useful without substantially increasing environmental pollution or energy costs. It also is desirable to provide methods for fabricating such asphalt binders. Furthermore, other desirable features and characteristics of the present invention will become apparent from the subsequent detailed description of the invention and the appended claims, taken in conjunction with the accompanying drawings and this background of the invention.

BRIEF SUMMARY

Plastomer-modified asphalt binders meeting MSCR specifications, asphalt paving materials with such asphalt binders, and methods for fabricating such asphalt binders are provided. In an exemplary embodiment, an asphalt binder contains a base asphalt and a plastomer. When the plastomer has a drop point no greater than 139° C., the asphalt binder further comprises sulfur; sulfur-containing compounds, such as hydrocarbyl polysulfides and thiuram disulfides; phenolic resins; metal oxides; or a combination thereof. The asphalt binder is substantially free of elastomer.

In accordance with another exemplary embodiment, an asphalt paving material includes an asphalt binder comprising a base asphalt and a plastomer. When the plastomer has a drop point no greater than 139° C., the asphalt paving material further comprises sulfur; sulfur-containing compounds, such as hydrocarbyl polysulfides and thiuram disulfides; phenolic resins; metal oxides; or a combination thereof. The asphalt binder is substantially free of elastomer. The asphalt paving material also comprises an aggregate.

In accordance with a further exemplary embodiment, a method for fabricating an asphalt binder includes heating a base asphalt to a sufficiently liquid state. The base asphalt and a plastomer are combined. When the plastomer has a drop point no greater than 139° C., (a) sulfur; (b) sulfur-containing compounds, such as hydrocarbyl polysulfides and thiuram disulfides; (c) phenolic resins; (d) metal oxides; or (e) a combination thereof are also incorporated into the base asphalt. The asphalt binder is substantially free of elastomer.

BRIEF DESCRIPTION OF THE DRAWINGS

The various embodiments will hereinafter be described in conjunction with the following drawing figures, wherein like numerals denote like elements, and wherein:

FIG. 1 is a table illustrating the results of MSCR tests of asphalt binders containing plastomers exhibiting various drop points. The asphalt binders are formed from a PG 64-22 base asphalt from the mid-continent region of the United States. The tests are conducted at the operational environmental temperature of 64° C.

DETAILED DESCRIPTION

Figure 2:
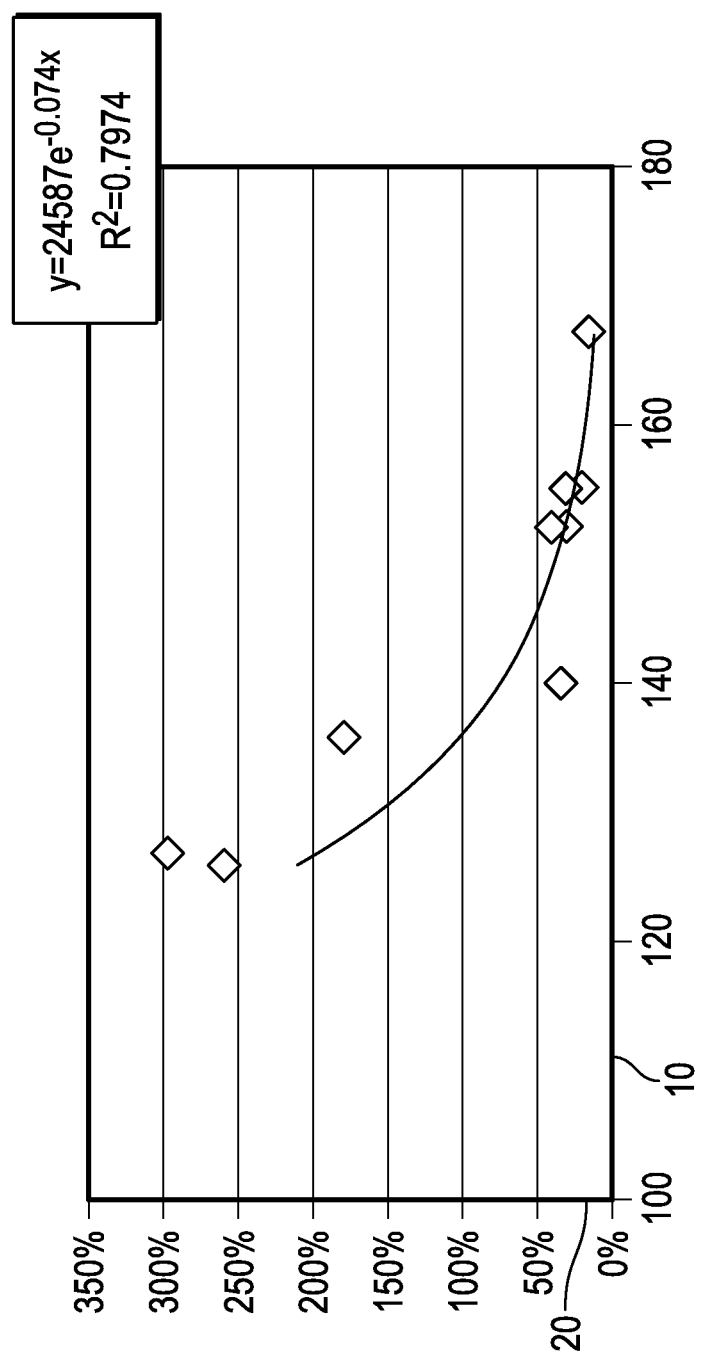
FIG. 2 is a graph illustrating the results of FIG. 1.

The following detailed description is merely exemplary in nature and is not intended to limit the various embodiments or the application and uses thereof. Furthermore, there is no intention to be bound by any theory presented in the preceding background or the following detailed description.

The various embodiments contemplated herein relate to asphalt binders that include a base asphalt and a plastomer. When the plastomer has a drop point no greater than 139° C., the asphalt binder also may also contain (a) sulfur; (b) sulfur-containing compounds, such as hydrocarbyl polysulfides and thiuram disulfides, particularly tetramethyl thiuram disulfide (TMTD), tetraethyl thiuram disulfide (TETD) and tetrabutyl thiuram disulfide (TBUT); (c) phenolic resins, particularly phenol-aldehyde resin; (d) metal oxides, such as zinc oxides; or (e) a combination thereof. The asphalt binders contemplated herein can meet both the MSCR non-recoverable creep compliance, $J_{nr}$ specification and also the MSCR stress sensitivity $J_{nr,diff}$ specification without the presence of elastomers. In this regard, they can be used to fabricate asphalt paving materials at lower temperatures than if elastomers were present and result in lower temperature road paving while also effectively facilitating reduced road rutting.

Methods for measuring an asphalt binder's performance have changed over time, exposing shortcomings of conventional asphalt binders. The Performance Graded (PG) System is a method of measuring asphalt binder performance that was originally developed during the Strategic Highway Research Project Program in the United States in the early 1990's. The Superpave™ performance grading (PG) specification classifies asphalt binders into performance grades that change at 6° C. intervals according to service climate. For example, a Superpave Performance Grade PG 64-22 meets high temperature physical properties up to 64° C. and low temperature physical properties down to −22° C. While this system works well for conventional-speed, moderate-traffic volume pavements, research indicates that it needs some refinement for pavements that have slow-speed loading and high traffic volume. Rather than change criteria and/or test conditions to reflect a change in loading time and traffic volume, in the PG System traffic speed and volume are adjusted for by "grade-bumping" or testing at higher temperatures than indicated by the climate. For example, for a standard traffic asphalt pavement, a PG 64-22 asphalt binder might be used but a high-volume highway pavement might require a PG 76-22 asphalt binder—even though the pavement temperature would likely never get above 64° C.

More recent research has resulted in the Multiple Stress Creep Recovery (MSCR) test, with the methodology described in AASHTO T350-14 and the specification in AASHTO M332-14. The MSCR test provides the user with a new high temperature binder specification that is intended to more accurately indicate the rutting performance of the asphalt binder. The MSCR test uses the well-established creep and recovery test concept to evaluate the binder's potential for permanent deformation. Using the Dynamic Shear Rheometer (DSR), the same piece of equipment used in the existing PG specification, a one-second creep load is applied to the asphalt binder sample, which has been short-term aged using the Rolling Thin Film Oven (RTFO). After the 1-second load is removed, the sample is allowed to recover for 9 seconds. The test begins with the application of a low stress (0.1 kPa) for 10 creep/recovery cycles, then the stress is increased to 3.2 kPa and repeated for an additional 10 cycles. The average of the non-recoverable strain divided by the applied stress (for both 0.1 and 3.2 kPa) at ten loading cycles are the non-recoverable creep compliance, $J_{nr}$.

A major difference between the MSCR specification and the PG System is how grade bumping is done. With the MSCR specification, the binder testing is done at the high environmental temperature that the pavement is expected to experience. If the climate grade is a PG64 or PG58, all high temperature testing is conducted at 64° C. or 58° C. If heavy traffic is expected the specification requirement is changed, i.e., a lower $J_{nr}$ value is required to reflect the increased stress the pavement will actually experience, but testing is still done at, for example, 64° C. for a PG 64 climate. For example the MSCR specification $J_{nr}$ for standard fast moving traffic is a maximum of 4.5 $kPa^{-1}$ and for slow moving or higher traffic the required $J_{nr}$ value would be a maximum of 2.0, 1.0 or 0.5 to require a more rut-resistant material instead of testing at a higher temperature. High temperature testing for each S, H, V or E grades (as explained below) would be done at the same pavement climate temperature of, for example, 58° C. or 64° C. This allows for accurate evaluation of the binder at the expected operating temperature. A section of the AASHTO specification is shown in Table 1 below, where grade bumping is done by changing the required specification value of standard, heavy, very heavy, or extreme traffic, not by changing temperature.

TABLE 1

The MSCR gradings reflect the current grade bumping limits.

| | |
|---|---|
| Standard S grade | traffic <3 million ESAL's |
| Heavy H grade | traffic >3 million ESAL's |
| Very Heavy V grade | traffic >10 million ESAL's |
| Extreme E grade | traffic >30 million ESAL's | where "ESAL's" is "equivalent single axle loads."

The stress sensitivity parameter $J_{nr,diff}$ is calculated using the equation $J_{nr,diff}=(J_{nr, 3.2kPa}-J_{nr,0.1kPa})/J_{nr,0.1kPa}$. The $J_{nr,diff}$ is required under the MSCR specification to be below 75% to insure that the binder will not be overly stress sensitive to unexpected heavy loads or unusually high temperatures.

As noted above, the asphalt binder as contemplated herein includes a base asphalt. All types of asphalt, naturally occurring and synthetically manufactured, may be used in accordance with the asphalt binders contemplated herein. For example, industrial asphalts used for pavings, coatings, sealants, roofing materials, adhesives, and other applications may be used. Asphalt is defined by the ASTM as a dark brown to black cementitious material in which the predominant constituents are bitumens that occur in nature or are obtained in petroleum processing. Asphalts characteristically contain saturates, aromatics, resins and asphaltenes. Naturally occurring asphalt is inclusive of native rock asphalt, lake asphalt, and the like. Synthetically manufactured asphalt is often a byproduct of petroleum refining or post refining operations and includes air-blown asphalt, blended asphalt, cracked or residual asphalt, petroleum asphalt, propane asphalt, straight-run asphalt, thermal asphalt, and the like.

The asphalt binder also includes a plastomer. As used herein, the term "plastomer" generally refers to polymers possessing moderate to high degrees of crystallinity that enhance the stiffness of an asphalt binder but provides little, if any, elasticity. In one exemplary embodiment, the plastomer contemplated herein has a drop point greater than 139° C. The drop point is defined by ASTM D3954. The drop or dropping point is a characteristic property of a material and is the temperature at which the first drop of the material falls from a cup under defined test conditions. Examples of plastomers suitable for use in the asphalt binders contemplated herein include maleated polypropylenes, such as, for example, Honeywell Titan™ 7278, which has a drop point of about 152° C. and a saponification number of from about 75 to about 95 mg KOH/gm, Honeywell Titan™ 7933, which has a drop point of about 155° C. and a saponification number of about 14 to about 22 mg KOH/gm; oxidized high density polyethylenes (defined as polyethylenes with a density of about 0.94 to about 1.0 gm/cm$^3$), such as, for example, Honeywell Titan™ 7817, which has a drop point of approximately 140° C. and an acid number of 7 mg KOH/gm; and polypropylenes, such as, for example Honeywell Titan™ 7457, which has a drop point of 167° C. and an acid number or a saponification number of about 0. All Honeywell Titan™ products are available from Honeywell International, Inc. of Morristown, N.J. In an embodiment, the plastomer or a mixture of plastomers is present in the asphalt binder in an amount no greater than 10 weight percent (wt. %) based on the total weight of the asphalt binder. These values represent the concentration for the final in-use asphalt binder. Higher concentrations can be used to make concentrates that are subsequently "let down" to the final in-use concentration.

In another embodiment, the asphalt binder is substantially free from elastomer. To the extent that the asphalt binder contains elastomer, it contains an amount that does not modify or amend the physical, mechanical or chemical properties of the asphalt binder. In one embodiment, the asphalt binder contains no more than 1 wt. % elastomer based on the total weight of the asphalt binder. As used herein, the term "elastomer" refers to a polymer that can enhance the stiffness of an asphalt binder and also impart elasticity.

In another exemplary embodiment, the asphalt binder includes an additive chosen from sulfur; sulfur-containing compounds, such as hydrocarbyl polysulfides and thiuram disulfides, particularly tetramethyl thiuram disulfide (TMTD), tetraethyl thiuram disulfide (TETD) and tetrabutyl thiuram disulfide (TBUT); phenolic resins, particularly phenol-aldehyde resin; metal oxides, such as zinc oxides; or a combination thereof. One or more of these additives can facilitate lowering of both non-recoverable creep compliance, $J_{nr}$, and also the stress sensitivity parameter $J_{nr,diff}$, of the asphalt binder such that when used in combination with a plastomer, the plastomer no longer needs a drop point greater than 139° C., although more plastomer may be required to make the same MSCR grade. In one embodiment, the sulfur is added to the asphalt binder as elemental sulfur. In an exemplary embodiment, the additive is present in the asphalt binder in an amount greater than zero and no greater than about 1 wt. % based on a total weight of the asphalt binder.

In one embodiment, an asphalt paving material contains the asphalt binder contemplated herein. In addition to the asphalt binder described above, the asphalt paving material includes an aggregate. "Aggregate" is a collective term for mineral materials, such as, for example, sand, gravel, or crushed stone that are combined with the asphalt binder to form the asphalt paving material. The aggregate may comprise natural aggregate, manufactured aggregate, or a combination thereof. Natural aggregate is typically extracted rock from an open excavation (e.g. a quarry) that is reduced to usable sizes by mechanical crushing. Manufactured aggregate is typically a byproduct of other manufacturing processes such as slag from metallurgical processing (e.g. steel, tin, and copper production). Manufactured aggregate also includes specialty materials that are produced to have a particular physical characteristic not found in natural rock, such as, for example, low density. The gradation of the aggregates is carefully controlled in a hot mix design to optimize its performance. Hot mix designs can be categorized in "dense graded," Stone Matrix Asphalt (SMA), Open Graded Friction Course (OGFC) and the like based on the relative proportions of the aggregate sized. In an exemplary embodiment, about 3 to about 8 wt. % of the asphalt binder is mixed with about 92 to about 97 wt. % aggregate to form an asphalt paving material. Other well-known additives also can be added to the hot mix, including anti-stripping materials, warm mix additives, fibers and the like.

In an exemplary embodiment, a method for preparing an asphalt binder as contemplated herein is provided. The method includes heating the base asphalt to a sufficiently liquid state such that the plastomer and any other modifier can be more easily incorporated. In one embodiment, the base asphalt is heated to a temperature of about 75 to about 200° C. For faster incorporation, the temperature can be above the melting point of the plastomer. The asphalt can be neat or can contain other additives at this point, such as, for example, ground tire rubber (GTR), reclaimed asphalt pavement (RAP), reclaimed asphalt shingle (RAS), phosphoric acid, polyphosphoric acid, ethylene/vinyl acetate copolymer, and the like, or various combinations of these modifiers. The asphalt and a plastomer as contemplated herein are combined using, for example, a low shear mixer at a sufficient mixing speed to homogeneously incorporate the plastomer into the asphalt within a reasonable time frame. In a lab, for example, the low shear mixer can operate with a mixing speed of from about 5 to about 800 revolutions per minute (RPM). If the asphalt does not yet contain sulfur; sulfur-containing compounds, such as hydrocarbyl polysulfides and thiuram disulfides; phenolic resins; metal oxides; or a combination thereof, one or more of these additives can be added to the asphalt binder at this time. The mixing continues for a time sufficient to make a homogeneous blend, such as about 30 minutes to about four hours.

Table 1 illustrates the results of tests of stress sensitivity $J_{nr,diff}$ of asphalt binders containing plastomers exhibiting two different drop points. The asphalt binders are formed from two different base asphalts, PG 64-22A and PG 64-22B, both from the mid-continent region of the United States. The asphalt binders contained 97.55 wt. % base asphalt and 2.45 wt. % plastomer. The tests are conducted at the operational environmental temperatures of 64° C. and 76° C.

TABLE 1

| polymer | drop point (° C.) | Jnr-diff @ 64° C. 64-22A | Jnr-diff @ 64° C. 64-22B |
|---|---|---|---|
| Honeywell Titan ™ 7686 | 136 | 42.20% | 68.26% |
| Honeywell Titan ™ 7278 | 152 | 26.80% | 35.51% |

| Polymer | drop point (° C.) | Jnr-diff @ 76° C. 64-22A | Jnr-diff @ 76° C. 64-22B |
|---|---|---|---|
| Honeywell Titan ™ 7686 | 136 | 125.05% | 133.74% |
| Honeywell Titan ™ 7278 | 152 | 30.18% | 47.65% |

As Table 1 shows, the asphalt binders with a plastomer having a drop point below 139° C. had higher $J_{nr,diff}$ values than the plastomer with the drop point above 139° C. and failed the MSCR specification at 76° C., that is, the $J_{nr,diff}$ is above 75%, while the asphalt binders with a plastomer having a drop point above 139° C. passed the MSCR specification, that is, the $J_{nr,diff}$ is significantly below 75% at both testing temperatures.

FIG. 1 illustrates the results of tests of stress sensitivity $J_{nr,diff}$ performed on asphalt binders containing seven different plastomers. Three of the asphalt binders contained plastomers exhibiting different drop points below 139° C., that is, 136° C., 126.5° C., and 126° C. As shown in FIG. 1, these three different asphalt binders failed the MSCR specification with $J_{nr,diff}$ above 75%. The asphalt binders with plastomers having drop points above 139° C. all passed the MSCR specification. FIG. 2 is a graphic illustration of FIG. 1 with the plastomer drop points on the x-axis 10 and $J_{nr,diff}$ on the y-axis 20. From FIG. 2 it appears that as the drop point of the plastomer added to the asphalt binder increased, $J_{nr,diff}$ of the asphalt binder decreased.

Table 2 illustrates the effects of sulfur on asphalt binders contemplated herein. Results of non-recoverable creep compliance, $J_{nr}$, and stress sensitivity $J_{nr,diff}$ tests performed on a neat asphalt binder and the asphalt binder with plastomers having two different drop points are shown. The asphalt binder 64-22 E was from the mid-continent region of the United States. Honeywell Titan™ 7205 is a mid-density (a density of about 0.925 to about 0.94 gm/cm³) polyethylene homopolymer with a drop point of 115° C. and Honeywell Titan™ 7278 has a drop point of 152° C.

TABLE 2

| Composition | | | | | | | | |
|---|---|---|---|---|---|---|---|---|
| PG 64-22 E | | 100.00% | 99.90% | 97.00% | 96.9% | 97.3% | 97.5% | 97.4% |
| Honeywell Titan ™ 7205 | | | | 3.0% | 3.0% | 2.5% | | |
| Honeywell Titan ™ 7278 | | | | | | | 2.5% | 2.5% |
| Sulfur | | | 0.1% | | 0.1% | 0.2% | | 0.1% |
| Total | | 1.00 | 1.00 | 1.00 | 1.00 | 1.00 | 1.00 | 1.00 |
| MSCR Specification | Temp (° C.) | | | | | | | |
| $J_{nr,\ 3.2\ kPa}$ (kPa$^{-1}$) | 64 | 2.570 | 2.120 | 1.047 | 0.865 | 0.975 | 1.170 | 0.873 |
| $J_{nr\ diff}$ <= 75% | 64 | 8.88% | 10.35% | 102.78% | 71.83% | 53.79% | 29.52% | 26.35% |
| MSCR grade | | 64S | 64S | failed | 64V | 64V | 64H | 64V |

As shown in Table 2, for the neat asphalt binder, the addition of sulfur caused the non-recoverable creep compliance, $J_{nr}$, to drop slightly, although the MSCR grade remained the same at "S." The asphalt binder with the 3 wt. % plastomer having a drop point no greater than 139° C. failed the stress sensitivity parameter $J_{nr,diff}$ specification. However, the addition of 0.1% sulfur caused the asphalt binder to exhibit an "V" grade in addition to passing the stress sensitivity parameter $J_{nr,diff}$ specification. The addition of 0.2% sulfur to the binder containing 2.5 wt. % plastomer caused the asphalt binder to make a PG 64V grade and exhibit an even lower $J_{nr,diff}$ value at 53.79%. Adding 2.5 wt. % plastomer with a drop point greater than 139° C. (Honeywell Titan™ 7278) to the neat asphalt binder dropped the $J_{nr}$ value and raised the MSCR grade from an "S" to a "H." However, the addition of 0.1% sulfur served to drop the $J_{nr}$ value even further, raising the MSCR grade from an "H" to a "V" while also dropping the $J_{nr,diff}$ value. Thus, use of the plastomer with a drop point greater than 139° C. enabled less plastomer to meet the PG 64H-22 grade and less plastomer and less sulfur to meet the PG 64V-22 grade.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An asphalt binder comprising:
   a base asphalt; and
   a plastomer comprising;
      a maleated polypropylene having a drop point of from about 152° C. to about 155° C.,
      a polypropylene homopolymer having a drop point of about 167° C., or
      a combination thereof;
   wherein the asphalt binder is substantially free of elastomer.

2. The asphalt binder of claim 1, wherein the maleated polypropylene has a drop point of about 152° C. and a saponification number of from about 75 to about 95 mg KOH/gm.

3. The asphalt binder of claim 1, wherein the maleated polypropylene has a drop point of about 155° C. and a saponification number of about 14 to about 22 mg KOH/gm.

4. The asphalt binder of claim 1, wherein the polypropylene homopolymer has saponification number of about 0 mg KOH/gm.

5. The asphalt binder of claim 1, further comprising an additive selected from the group consisting of sulfur, sulfur-containing compounds, phenolic resins, metal oxides, or a combination thereof.

6. The asphalt binder of claim 1, wherein the plastomer is present in the asphalt binder in an amount no greater than about 10 wt. % based on a total weight of the asphalt binder.

7. The asphalt binder of claim 5, wherein the additive is present in the asphalt binder in an amount no greater than about 1 wt. % based on a total weight of the asphalt binder.

8. The asphalt binder of claim 1, wherein the base asphalt is utilized for paving applications, coating applications, sealant applications, roofing material applications, or adhesive applications.

9. An asphalt paving material comprising:
an asphalt binder comprising:
  a base asphalt; and
  a plastomer comprising;
    a maleated polypropylene having a drop point of from about 152° C. to about 155° C.,
    a polypropylene homopolymer having a drop point of about 167° C., or
    a combination thereof;
  wherein the asphalt binder is substantially free of elastomer; and an aggregate.

10. The asphalt paving material of claim 9, wherein the maleated polypropylene has a drop point of about 152° C. and a saponification number of from about 75 to about 95 mg KOH/gm.

11. The asphalt paving material of claim 9, wherein the maleated polypropylene has a drop point of about 155° C. and a saponification number of about 14 to about 22 mg KOH/gm.

12. The asphalt paving material of claim 9, wherein the polypropylene homopolymer that has a drop point of about 167° C. and a saponification number of about 0.

13. The asphalt paving material of claim 9, further comprising an additive selected from the group consisting of sulfur, sulfur-containing compounds, phenolic resins, metal oxides, or a combination thereof.

14. The asphalt paving material of claim 13, wherein the additive is present in the asphalt binder in an amount no greater than about 1 wt. % based on a total weight of the asphalt binder.

15. The asphalt paving material of claim 9, wherein the plastomer is present in the asphalt binder in an amount no greater than about 10 wt. % based on a total weight of the asphalt binder.

16. An asphalt binder comprising:
a base asphalt; and
a plastomer comprising;
  a maleated polypropylene having a drop point of about 152° C.,
  a maleated polypropylene having a drop point of about 155° C.,
  a polypropylene homopolymer having a drop point of about 167° C., or combinations thereof;
wherein the asphalt binder is substantially free of elastomer.

17. The asphalt binder of claim 16, wherein the maleated polypropylene has a saponification number of from about 75 to about 95 mg KOH/gm.

18. The asphalt binder of claim 16, wherein the maleated polypropylene has a saponification number of from about 14 to about 22 mg KOH/gm.

19. The asphalt binder of claim 16, wherein the polypropylene homopolymer has a saponification number of about 0 mg KOH/gm.

* * * * *